United States Patent
Pedlow, Jr. et al.

(10) Patent No.: US 7,215,770 B2
(45) Date of Patent: May 8, 2007

(54) SYSTEM AND METHOD FOR PARTIALLY ENCRYPTED MULTIMEDIA STREAM

(75) Inventors: Leo M. Pedlow, Jr., Ramona, CA (US); Henry Derovanessian, San Diego, CA (US); Brant Candelore, Escondido, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 664 days.

(21) Appl. No.: 10/403,834

(22) Filed: Mar. 31, 2003

(65) Prior Publication Data

US 2004/0073917 A1    Apr. 15, 2004

Related U.S. Application Data

(63) Continuation-in-part of application No. 10/038,217, filed on Jan. 2, 2002, and a continuation-in-part of application No. 10/038,032, filed on Jan. 2, 2002, and a continuation-in-part of application No. 10/037,914, filed on Jan. 2, 2002, and a continuation-in-part of application No. 10/037,499, filed on Jan. 2, 2002, and a continuation-in-part of application No. 10/037,498, filed on Jan. 2, 2002.

(60) Provisional application No. 60/429,011, filed on Nov. 22, 2002, provisional application No. 60/409,675, filed on Sep. 9, 2002, provisional application No. 60/372,870, filed on Apr. 16, 2002.

(51) Int. Cl.
*H04L 9/00* (2006.01)
*H04N 7/167* (2006.01)

(52) U.S. Cl. .......................................... 380/42; 725/31

(58) Field of Classification Search .................. 380/42; 725/31
See application file for complete search history.

(56) References Cited

U.S. PATENT DOCUMENTS 3,852,519 A    12/1974    Court (Continued)

FOREIGN PATENT DOCUMENTS

EP    0471373    2/1992

(Continued)

OTHER PUBLICATIONS

Selective Encryption and MPEG-2, by , T. Lookabaugh, I. Vedula, D. Sicker, published 2000.*

(Continued)

*Primary Examiner*—Gilberto Barron, Jr.
*Assistant Examiner*—F. Homayounmehr
(74) *Attorney, Agent, or Firm*—John L. Rogitz

(57) ABSTRACT

A multimedia stream head end includes a legacy conditional access (CA) device that fully encrypts the stream using legacy keys. A copy of the stream is sent to a secondary CA device that encrypts only critical packets in the stream using secondary keys to render a partially encrypted stream. The critical packets in the fully encrypted stream from the legacy CA device are obtained and inserted next to the corresponding critical packets in the partially encrypted stream. Thus, only critical packets are encrypted, with encrypted versions being generated by both the legacy CA and secondary CA without the legacy CA knowing which of the packets that it encrypts are "critical".

17 Claims, 1 Drawing Sheet

U.S. PATENT DOCUMENTS

| | | |
|---|---|---|
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A * | 8/1995 | Adams et al. ............... 713/153 |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,528,608 A | 6/1996 | Shimizume |
| 5,535,276 A | 7/1996 | Ganesan |
| 5,539,823 A | 7/1996 | Martin et al. |
| 5,539,828 A | 7/1996 | Davis |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,894,320 A | 4/1999 | Vancelette |
| 5,894,516 A | 4/1999 | Brandenburg |
| 5,915,018 A | 6/1999 | Aucsmith |
| 5,922,048 A | 7/1999 | Emura |
| 5,923,755 A | 7/1999 | Birch |
| 5,930,361 A | 7/1999 | Hayashi et al. |
| 5,933,500 A | 8/1999 | Blatter et al. |
| 5,949,877 A | 9/1999 | Traw et al. |
| 5,949,881 A | 9/1999 | Davis |
| 5,973,679 A | 10/1999 | Abbott et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |
| 6,058,192 A * | 5/2000 | Guralnick et al. ........... 380/240 |
| 6,061,451 A | 5/2000 | Muratani et al. |

| | | |
|---|---|---|
| 6,064,748 A | 5/2000 | Hogan |
| 6,065,050 A | 5/2000 | DeMoney |
| 6,069,647 A | 5/2000 | Sullivan et al. |
| 6,070,245 A | 5/2000 | Murphy, Jr. et al. |
| 6,072,872 A | 6/2000 | Chang et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,551 A | 10/2000 | Aucsmith |
| 6,148,082 A | 11/2000 | Slattery et al. |
| 6,154,206 A | 11/2000 | Ludtke |
| 6,157,719 A | 12/2000 | Wasilewski et al. |
| 6,181,334 B1 | 1/2001 | Freeman et al. |
| 6,185,369 B1 | 2/2001 | Ko et al. |
| 6,185,546 B1 | 2/2001 | Davis |
| 6,189,096 B1 | 2/2001 | Haverty |
| 6,192,131 B1 | 2/2001 | Geer et al. |
| 6,199,053 B1 | 3/2001 | Herbert et al. |
| 6,204,843 B1 | 3/2001 | Freeman et al. |
| 6,209,098 B1 | 3/2001 | Davis |
| 6,215,484 B1 | 4/2001 | Freeman et al. |
| 6,226,618 B1 | 5/2001 | Downs |
| 6,229,895 B1 | 5/2001 | Son et al. |
| 6,230,194 B1 | 5/2001 | Frailong et al. |
| 6,230,266 B1 | 5/2001 | Perlman et al. |
| 6,236,727 B1 | 5/2001 | Ciacelli et al. |
| 6,240,553 B1 | 5/2001 | Son et al. |
| 6,246,720 B1 | 6/2001 | Kutner et al. |
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,568 B1 | 9/2001 | Akins, III et al. |
| 6,292,892 B1 | 9/2001 | Davis |
| 6,307,939 B1 | 10/2001 | Vigarie |
| 6,311,012 B1 | 10/2001 | Cho et al. |
| 6,324,288 B1 | 11/2001 | Hoffman |
| 6,351,538 B1 | 2/2002 | Uz |
| 6,378,130 B1 | 4/2002 | Adams |
| 6,389,533 B1 | 5/2002 | Davis et al. |
| 6,389,537 B1 | 5/2002 | Davis et al. |
| 6,415,031 B1 | 7/2002 | Colligan et al. |
| 6,415,101 B1 | 7/2002 | deCarmo et al. |
| 6,430,361 B2 | 8/2002 | Lee |
| 6,445,738 B1 | 9/2002 | Zdepski et al. |
| 6,449,718 B1 | 9/2002 | Rucklidge et al. |
| 6,453,115 B1 | 9/2002 | Boyle |
| 6,459,427 B1 | 10/2002 | Mao et al. |
| 6,463,152 B1 | 10/2002 | Takahashi |
| 6,466,671 B1 | 10/2002 | Maillard et al. |
| 6,505,032 B1 | 1/2003 | McCorkle et al. |
| 6,505,299 B1 | 1/2003 | Zeng et al. |
| 6,510,554 B1 | 1/2003 | Gordon et al. |
| 6,519,693 B1 | 2/2003 | Debey |
| 6,529,526 B1 | 3/2003 | Schneidewend |
| 6,543,053 B1 | 4/2003 | Li et al. |
| 6,549,229 B1 | 4/2003 | Kirby et al. |
| 6,557,031 B1 | 4/2003 | Mimura et al. |
| 6,587,561 B1 | 7/2003 | Sered et al. |
| 6,640,145 B2 | 10/2003 | Hoffberg et al. |
| 6,650,754 B2 | 11/2003 | Akiyama et al. |
| 6,654,389 B1 | 11/2003 | Brunheroto et al. |
| 6,678,740 B1 | 1/2004 | Rakib et al. |
| 6,681,326 B2 | 1/2004 | Son et al. |
| 6,684,250 B2 | 1/2004 | Anderson et al. |
| 6,697,944 B1 | 2/2004 | Jones et al. |
| 6,754,276 B1 | 6/2004 | Harumoto et al. |
| 6,772,340 B1 | 8/2004 | Peinado et al. |
| 6,788,690 B2 | 9/2004 | Harri |
| 6,826,185 B1 | 11/2004 | Montanaro et al. |
| 6,859,335 B1 * | 2/2005 | Lai et al. ..................... 359/800 |
| 6,891,565 B1 | 5/2005 | Dieterich |
| 6,904,520 B1 | 6/2005 | Rosset et al. |
| 6,976,166 B2 | 12/2005 | Herley et al. |
| 2001/0030959 A1 | 10/2001 | Ozawa et al. |
| 2002/0026587 A1 | 2/2002 | Talstra et al. |
| 2002/0046406 A1 | 4/2002 | Chelehmal et al. |
| 2002/0047915 A1 | 4/2002 | Misu |
| 2002/0059425 A1 | 5/2002 | Belfiore et al. |
| 2002/0083317 A1 | 6/2002 | Ohta et al. |
| 2002/0083438 A1 * | 6/2002 | So et a. ........................ 725/31 |
| 2002/0097322 A1 | 7/2002 | Monroe et al. |
| 2002/0108035 A1 | 8/2002 | Herley et al. |
| 2002/0129243 A1 | 9/2002 | Nanjundiah |
| 2002/0170053 A1 | 11/2002 | Peterka et al. |
| 2002/0184506 A1 | 12/2002 | Perlman |
| 2002/0194613 A1 | 12/2002 | Unger ......................... 725/118 |
| 2002/0196939 A1 | 12/2002 | Unger et al. |
| 2003/0002854 A1 | 1/2003 | Belknap et al. |
| 2003/0009669 A1 | 1/2003 | White et al. |
| 2003/0021412 A1 | 1/2003 | Candelore et al. |
| 2003/0026423 A1 | 2/2003 | Unger ......................... 380/217 |
| 2003/0031172 A1 * | 2/2003 | Grinfeld ...................... 370/389 |
| 2003/0046686 A1 | 3/2003 | Candelore et al. |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow ........................ 380/218 |
| 2003/0123849 A1 | 7/2003 | Nallur et al. |
| 2003/0126086 A1 | 7/2003 | Safadi |
| 2003/0133570 A1 | 7/2003 | Candelore .................... 380/214 |
| 2003/0140257 A1 | 7/2003 | Peterka et al. |
| 2003/0145329 A1 | 7/2003 | Candelore |
| 2003/0152224 A1 | 8/2003 | Candelore .................... 380/210 |
| 2003/0152226 A1 | 8/2003 | Candelore .................... 380/210 |
| 2003/0156718 A1 | 8/2003 | Candelore .................... 380/212 |
| 2003/0159139 A1 | 8/2003 | Candelore .................... 380/212 |
| 2003/0159140 A1 | 8/2003 | Candelore .................... 380/239 |
| 2003/0159152 A1 | 8/2003 | Lin et al. |
| 2003/0174837 A1 | 9/2003 | Candelore ..................... 725/32 |
| 2003/0188154 A1 | 10/2003 | Dallard |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0028227 A1 | 2/2004 | Yu |
| 2004/0047470 A1 | 3/2004 | Candelore .................... 380/240 |
| 2004/0049688 A1 | 3/2004 | Candelore ..................... 380/28 |
| 2004/0049690 A1 | 3/2004 | Candelore et al. |
| 2004/0049691 A1 | 3/2004 | Candelore .................... 713/193 |
| 2004/0049694 A1 | 3/2004 | Candelore |
| 2004/0078575 A1 | 4/2004 | Morten et al. |
| 2004/0081333 A1 | 4/2004 | Grab et al. |
| 2004/0091109 A1 | 5/2004 | Son et al. |
| 2004/0123094 A1 | 6/2004 | Sprunk |
| 2004/0139337 A1 * | 7/2004 | Pinder et al. ................. 713/189 |
| 2004/0165586 A1 | 8/2004 | Read et al. |
| 2004/0187161 A1 * | 9/2004 | Cao ............................. 725/110 |
| 2004/0193550 A1 | 9/2004 | Siegal |
| 2004/0240668 A1 | 12/2004 | Bonan |

| | | | |
|---|---|---|---|
| 2005/0004875 A1 | 1/2005 | Kontio et al. | |
| 2005/0028193 A1 | 2/2005 | Candelore | 725/32 |
| 2005/0036067 A1 | 2/2005 | Ryal | 382/284 |
| 2005/0066357 A1 | 3/2005 | Ryal | 725/28 |
| 2005/0071669 A1 | 3/2005 | Medvinsky et al. | |
| 2005/0094808 A1 | 5/2005 | Pedlow | 380/210 |
| 2005/0094809 A1 | 5/2005 | Pedlow | 380/210 |
| 2005/0097596 A1 | 5/2005 | Pedlow | 380/200 |
| 2005/0097597 A1 | 5/2005 | Pedlow | 380/211 |
| 2005/0097598 A1 | 5/2005 | Pedlow | 380/211 |
| 2005/0097614 A1 | 5/2005 | Pedlow | 375/240.08 |
| 2005/0102702 A1 | 5/2005 | Candelore | 725/153 |
| 2005/0129233 A1 | 6/2005 | Pedlow | 380/239 |
| 2005/0169473 A1 | 8/2005 | Candelore | 380/239 |
| 2005/0192904 A1 | 9/2005 | Candelore | 705/54 |
| 2005/0259813 A1* | 11/2005 | Wasilewski et al. | 380/28 |
| 2006/0115083 A1 | 6/2006 | Candelore | 380/216 |
| 2006/0153379 A1 | 7/2006 | Candelore | 380/216 |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0833517 | 4/1998 |
| EP | 0866615 | 9/1998 |
| EP | 1 187 483 A2 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 97/38530 | 10/1997 |
| WO | WO 00/31964 * | 6/2000 |
| WO | WO 01/65762 | 9/2001 |
| WO | WO 01/78386 | 10/2001 |
| WO | WO 01/78386 A2 | 10/2001 |

OTHER PUBLICATIONS

U.S. Appl. No. 11/474,625, filed Jun. 26, 2006, Unger et al.
U.S. Appl. No. 11/474,550, filed Jun. 26, 2006, Candelore et al.
U.S. Appl. No. 11/365,564, filed Mar. 1, 2006, Candelore.
U.S. Appl. No. 11/344,292, filed Jan. 31, 2006, Pedlow, Jr.
U.S. Appl. No. 10/662,585, filed Sep. 15, 2003, Ryal.
"How Networks Work—Millennium Edition"—pp. 88-89, Que Corporation, 2000.
Anonymous, Message Authentication with Partial encryption, Research disclosure RD 296086, Dec. 10, 1988.
"Performance Study of a Selective Encryption Scheme for the Security of Networked, Real-Time Video" by Spanos and Maples, pp. 2-10, 1995, IEEE.
"An Empirical Study of Secure MPEG Video Transmissions" by Agi and Gong, pp. 137-144, 1996, IEEE, Proceedings of SNDSS '96.
"Selective Encryption and Watermarking of MPEG Video (Extended Abstract)" by Wu and Wu, Feb. 17, 1997, submitted to International Conference on Image Science, Systems, and Technology, CISST'97.
"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
DVD Demystified—The Guidebook for DVD-Video and DVD-ROM by Jim Taylor, Pub. McGraw-Hill, 1998, ISBN: 0-07-064841-7, pp. 134-147.
"An Efficient MPEG Video Encryption Algorithm" by Shi and Bhargava, pp. 381-386, 1998 IEEE.
"Comparison of MPEG Encryption Algorithms" Qioa and Nahrstedt, Department of Computer Science, University of Illinois at Urbana-Champaign, Jan. 17, 1998.

"Applying Encryption to Video Communication" by Kunkelmann, pp. 41-47, Sep. 1998, Multimedia and Security Workshop at ACM Multimedia '98, Bristol, U.K.
Anonymous, New Digital Copy Protection Proposal Would Serve Authorized Copies, PR Newswire, Nov. 1988, pp. 1-3.
"Evaluation of Selective Encryption Techniques for Secure Transmission of MPEG-Compressed Bit-Streams" by Alattar and Al-Regib, pp. IV-340 to IV-343m 1999, IEEE.
"Improved Selective Encryption Techniques for Secure Transmission of MPEG Video Bit-Streams" by Alattar, Al-Regib and Al-Semari, pp. 256-260, 1999, IEEE.
"Efficient Frequency Domain Video Scrambling for Content Access Control" by Zeng and Lei, Nov. 1999, In Proc. ACM Multimedia.
"Transport Streams Insertion of Video in the Compressed Digital Domain" by SeaChange Internation, Web Site Literature, 2000.
"A Report on Security Issues in Multimedia" by Gulwani, pp. 10-14, Apr. 30, 2000, (Boston, Ma.,USA).
"Fast Encryption Methods for Audiovisual Data Confidentiality" by Wu and Kuo, Nov. 2000, SPIE International Symposia on Information Technologies 2000, (Boston, Ma., USA).
"Visible World—A High Impact Approach to Customized Television Advertising" by Haberman, Dec. 2001.
"Pre-Encryption Profiles Concept Overview and Proposal" Rev. 1.2, John B. Carlucci, Dec. 5, 2000.
"Ad Agencies and Advertisers To Be Empowered with Targeted Ads Delivered by Television's Prevailing Video Servers" Article Business Section of The New York Times, Updated Thursday, Dec. 20, 2001.
"Dynamic-Customized TV Advertising Creation and Production Tools" by SeaChange International, Web Site Literature, Date Unknown.
Metro Media ™ PVR-DVD-MP3-Web—Internet publication from www.metrolink.com, undated.
"Multimedia and Security Workshop at ACM Multimedia" '98. Bristol, U.K., Sep. 1998.
"Passage ™, Freedom to Choose", 2003, Sony Electronics Inc.
"Pre-Encryption Profiles—Concept Overview and Proposal", Rev. 1.2 as submitted to the Open CAS consortium on Dec. 28, 2000.
"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
"The Long March to Interoperable Digital Rights Management" by Koenen et al., pp. 1-17, 2004, IEEE.
"Transport Streams Insertion of Video in the Compressed Digital Domain" by SeaChange International, Web Site Literature, 2000.
Anonymous, Message Authentication with Partial Encryption, Research discourse RD 296086, Dec. 10, 1998, McCormac Hack Over Cablemodem, HackWatch, Aug. 10, 1998.
Anonymous, New Digital Copy Protection Proposal Would Secure Authorized Copies, PR Newswire, Nov. 1998, pp. 1-3.
Aravind, H. , et al., "Image and Video Coding Standards", AT&T Technical Journal, (Jan./Feb. 1993),67-68.
Gonzalez, R. C., et al., "Digital Image Processing", Addison Wesley Publishing Company, Inc., (1992),346-348.
Kim, et al., "Bit Rate Reduction Algorithm fo a Digital VCR", IEEE Transactions on Consumer Electronics, vol. 37, No. 3, (Aug. 1, 1992),267-274.
Kondo, et al., " A New Concealment Method for Digital VCRs", IEEE Visual Signal Processing and Communication, Melbourne, Australia, (Sep. 93),20-22.
"A Report on Security Issues in Multimedia" by Gulwani, pp. 10-14, Apr. 30, 2000, Course Notes, Department of Computer Science and Engineering, Indian Institute of Technology Kanpur.
"Comparison of MPEG Encryption Algorithms" by Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards/article.php/3418741.
"DVD Demystified—The Guidebook for DVD-Video and DVD-ROM" by Jim Taylor, Pub. McGraw-Hill, 1998, ISBN: 0-07-064841-7, pp. 134-147.

"Dynamic-Customized TV Advertising Creation and Production Tools" by SeaChange International, Web Site Literature.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corportaion, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993), 704-709.

Robert et al., "Digital Cable: The Key to Your Content", Access Intelligence's Cable Group, Feb. 2002, online at http://www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

Zheng Liu, Xue Li; "Motion Vector Encryption in Multimedia Streaming" Proceedings of the 10$^{th}$ International Multimedia Modeling Conference 2004 IEEE.

* cited by examiner

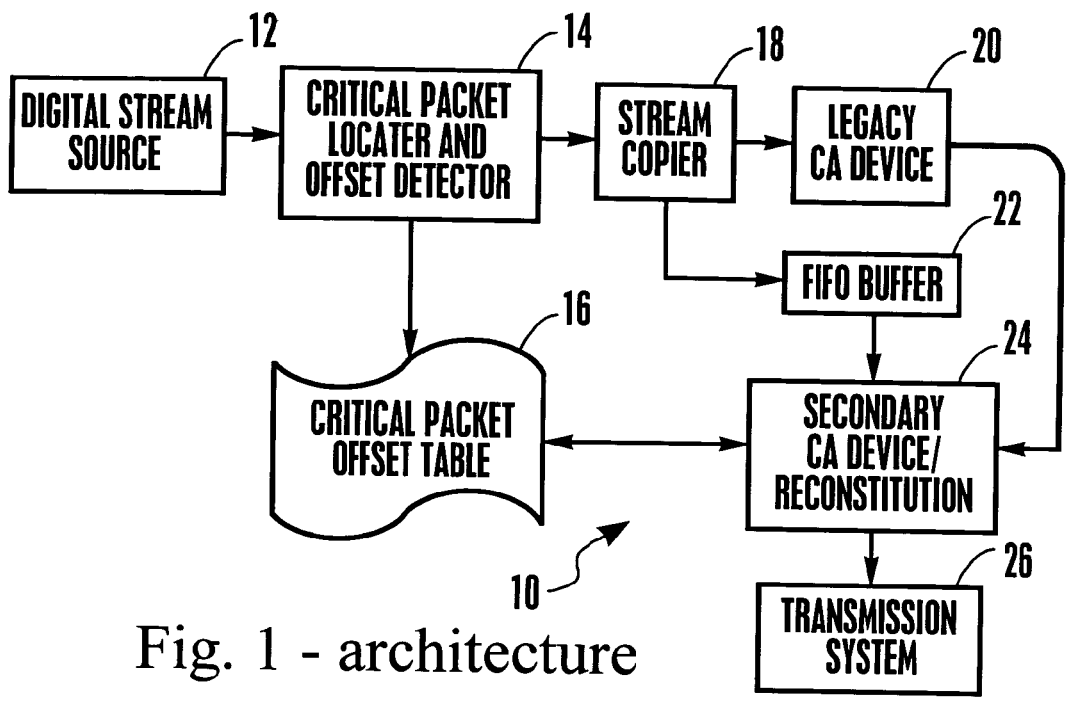
Fig. 1 - architecture
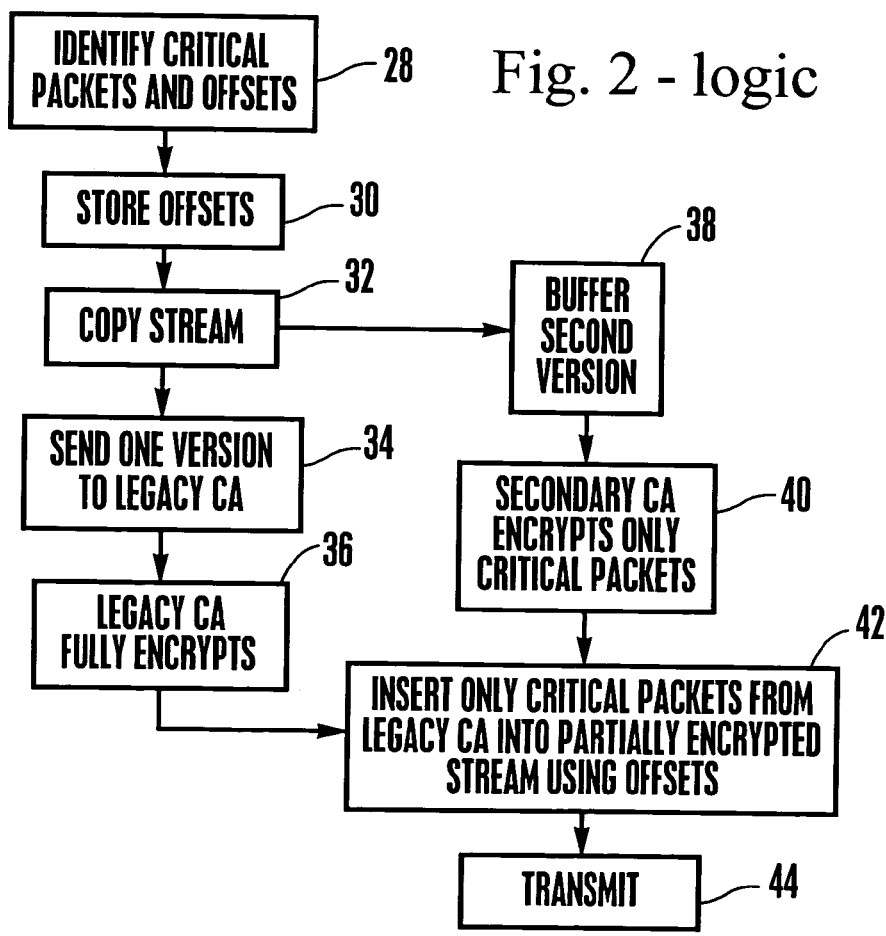
Fig. 2 - logic

SYSTEM AND METHOD FOR PARTIALLY ENCRYPTED MULTIMEDIA STREAM

RELATED APPLICATIONS

This application is a continuation-in-part of patent application entitled "Critical Packet Partial Encryption" to Unger et al., Ser. No. 10/038,217; patent application entitled "Time Division Partial Encryption" to Candelore et al., Ser. No. 10/038,032; application entitled "Elementary Stream Partial Encryption" to Candelore, Ser. No. 10/037,914; application entitled "Partial Encryption and PID Mapping" to Unger et al., Ser. No. 10/037,499; and application entitled "Decoding and Decrypting of Partially Encrypted Information" to Unger et al., Ser. No. 10/037,498 all of which were filed on Jan. 2, 2002 and are hereby incorporated by reference herein; this application is also related to and claims priority benefit of U.S. Provisional patent application Ser. No. 60/429,011, filed Nov. 22, 2002, entitled "Critical Packet Selection in an Encrypted Transport Stream Through Referenced Offset", to Pedlow; this application is also related to and claims priority benefit of U.S. Provisional patent application Ser. No. 60/409,675, filed Sep. 9, 2002, entitled "Generic PID Remapping for Content Replacement", to Candelore; this application is also related to and claims priority benefit of U.S. Provisional patent application Ser. No. 60/372,870 filed Apr. 16, 2002, entitled "Generic PID Remapping for Content Replacement Applications", to Candelore. This application is also related to U.S. patent applications Ser. No. 10/273,905, filed Oct. 18, 2002 to Candelore et al., entitled "Video Slice and Active Region Based Dual Partial Encryption"; Ser. No. 10/273,903, filed Oct. 18, 2002 to Candelore et al., entitled "Star Pattern Partial Encryption"; Ser. No. 10/274,084, filed Oct. 18, 2002 to Candelore et al., entitled "Slice Mask and Moat Pattern Partial Encryption"; and Ser. No. 10/274,019, filed Oct. 18, 2002 to Candelore et al., entitled "Video Scene Change Detection". Each of the above applications are hereby incorporated by reference herein.

FIELD OF THE INVENTION

The present invention relates generally to encrypted multimedia streams.

BACKGROUND OF THE INVENTION

Multimedia streams that are sought to be protected (e.g., pay-per-view sporting events, movies, and the like) can be encrypted at the transmitter (colloquially referred to as the "head end") with keys in a way that receiving television set-top boxes (STBs) that have complementary keys can decrypt the content for viewing. Accordingly, cable service providers must use head end conditional access (CA) devices that encrypt multimedia streams in accordance with the capabilities of the set-top boxes of the viewers. Many of these capabilities, including decryption capabilities, are proprietary to the makers of the set-top boxes.

It happens that only a very few "incumbent" companies sell most of the set-top boxes. Accordingly, competitors seeking to enter the cable television set-top box market must license the proprietary keys from the incumbents, often at high prices. This reduces competition.

A straightforward alternative way to permit competitive STB makers to enter the market without paying licensing fees to the incumbents would be to encourage the cable service providers, at their head ends, to completely encrypt each stream with as many CA devices (using respective sets of keys) as there are set-top box providers. This, however, would plainly undesirably multiply the amount of bandwidth necessary to carry a program. Accordingly, Sony has developed an encryption scheme whereby only "critical" portions, such as I-frames or headers, of a stream are encrypted, with the remainder of the stream being sent in the clear but being useless without being able to decrypt the "critical" portions. In this way, only the critical portions need be duplicated in encrypted form, not the entire stream. With more specificity, only the critical portions are encrypted both by the existing ("legacy") CA devices using the incumbents' keys and by a secondary conditional access process using a competitor's keys. Published U.S. patent application Ser. No. 10/038,217, filed Jan. 2, 2002 and incorporated herein by reference, discloses such a scheme.

As understood herein, the legacy CA components that are made by the incumbent providers can be programmed by the incumbent providers to detect that the above-mentioned process is ongoing. Consequently, the legacy components might be programmed by the incumbents to defeat the process and, thus, to maintain a de facto monopoly. Having recognized this possibility, the solution below is provided.

SUMMARY OF THE INVENTION

A method for multimedia transmission includes generating a copy of a multimedia stream to render first and second clear streams having identical predetermined portions. The method also includes sending the first clear stream to a first conditional access (CA) component, which can be a legacy component provided by an incumbent, to encrypt the entire first clear stream to render a completely encrypted stream without the legacy component knowing about the second clear stream. Encrypted versions of the predetermined portions are obtained from the completely encrypted stream. The second clear stream is used to encrypt the predetermined portions using a second CA component to render a partially encrypted stream. The method then contemplates inserting the encrypted predetermined portions obtained from the completely encrypted stream into the partially encrypted stream for transmission thereof.

In a preferred embodiment, the partially encrypted stream with two encrypted versions of each critical packet is sent to plural set-top boxes over cable. Or, the partially encrypted stream can be wirelessly broadcast to plural receivers.

Preferably, the method includes determining locations of the predetermined portions using corresponding offsets from at least one packet identifier (PID). The offsets can be in integral numbers of packets from at least one PID. In a preferred embodiment, the offsets are used for identifying the locations of the encrypted predetermined portions in the completely encrypted stream for obtaining them and inserting them into the partially encrypted stream, e.g., adjacent to the predetermined portions that were generated by the second CA component.

In another aspect, a system for dual partial encryption of a digital data stream includes means for copying the stream to render first and second streams, and first conditional access (CA) means for encrypting only critical portions of the first stream to render a partially encrypted stream. Legacy CA means encrypt the entire second stream to render a substantially fully encrypted stream. Means are provided for combining only critical portions from the fully encrypted stream with the partially encrypted stream.

In still another aspect, a system for use in a digital stream transmitter head end having a legacy conditional access (CA) device includes a system CA device that encrypts at least predetermined portions, and preferably only the predetermined portions, of a first version of a stream. A reconstitution component combines, into a stream such as the first version of the stream, the predetermined portions from the system CA device with the predetermined portions obtained from a full encryption of a second version of the stream generated by the legacy CA device.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is an architectural block diagram; and
FIG. 2 is a flow chart of the present logic.

DETAILED DESCRIPTION OF THE PREFERRED EMBODIMENT

Referring initially to FIG. 1, a system is shown, generally designated 10, that includes a source 12 of digital data streams, such as multimedia streams. The streams are sent to a critical packet locator and offset detector 14 which determines which packets in the stream are "critical". The critical packet locator and offset detector 14 also determines the offset (in integer numbers of packets from one or more packet identifiers (PID)) of each critical packet from a reference packet, e.g., the start of frame packet. The above-referenced patent application discusses critical packet selection. For clarity and completeness, critical packets may be information frames ("I-frames") in MPEG streams, or packetized elementary stream (PES) headers, or "action zones" of video, or other key packets that contain information which is essential to the successful recovery of picture and/or audio data. Preferably, packets containing references to program clock references (PCR) in the picture data (including presentation timestamp (PTS) and decoding timestamp (DTS) information) are never designated as "critical" packets.

As shown in FIG. 1, the offsets of the critical packets are stored in a critical packet offset table 16 or other data structure. Also, the stream is sent from the locator 14 to a stream copier 18 that makes a copy of the data stream. It is to be understood that the stream could be copied before critical packets and their offsets are identified.

As can be appreciated in reference to FIG. 1, one version of the stream is sent to a legacy conditional access (CA) device 20. The legacy CA device 20 can be considered to be a device provided by an incumbent that can process the stream by, e.g., encoding the stream with encryption keys, in accordance with the incumbent's proprietary CA scheme. The legacy CA device 20 completely encrypts the stream in accordance with conventional incumbent CA principles to render a fully encrypted stream.

Additionally, a version of the stream is sent from the stream copier to a buffer, preferably a circular first in first out (FIFO) buffer 22. The length of the buffer 22 should be of sufficient length (potentially a fixed length) to account for the delay caused by the processing time of the legacy CA device 20 in accordance with principles discussed below. The length of the FIFO buffer 22 may be established in increments of frame/picture or sequence/GOP for management purposes.

FIG. 1 shows that a secondary CA and reconstitution device 24 receives the clear stream from the FIFO buffer and the fully encrypted stream from the legacy CA device 20. The secondary CA and reconstitution device 24 includes a CA component, which encrypts only the critical packets in the clear stream received from the buffer 22, leaving the remaining portions of the stream unencrypted to render a partially encrypted stream. The secondary CA device 24 uses encryption keys that are different from those used by the legacy CA device 20. If desired, the pass through the secondary CA device 24 may slave to a new PCR value output by the legacy CA device 20, with the resulting corresponding value generated by the secondary CA device 24 differing by a fixed offset.

Also, the secondary CA and reconstitution device 24 includes a reconstitution component, which copies or strips or otherwise obtains only the now-encrypted critical packets from the fully encrypted stream received from the legacy CA device 20 and inserts the packets into the partially encrypted stream in accordance with principles below. The partially encrypted stream, now with two encrypted versions of each critical packet (one generated by the legacy CA device 20 and one generated by the secondary CA device 24) can be transmitted by a transmission system 26 over, e.g., cable, or terrestrial broadcast, or satellite broadcast.

It is to be understood that the functions of the secondary CA and reconstitution device 24 can be undertaken by separate components. It is to be further understood that the functions of the components 16, 18, 22, and 24 can be executed by a single secondary CA computing device or system or by separate devices/systems, and that the principles set forth herein apply to an overall system 10 that can have plural secondary CA systems.

The logic that is implemented by the system 10 shown in FIG. 1 can be seen in FIG. 2. Commencing at block 28, critical packets in the stream are identified, along with their offsets from a predetermined packet or packets, in accordance with principles set forth above. The offsets are stored (e.g., in the offset table 16) at block 30, and the stream is copied at block 32 by the stream copier 18.

A first clear version of the stream is sent to the legacy CA device 20 at block 34. At block 36, the legacy CA device 20 fully encrypts the stream in accordance with incumbent CA principles. In parallel, a second clear version of the stream is buffered at block 38 and then partially encrypted at block 40 by the secondary CA device 24. As mentioned above, the secondary CA device 24 encrypts only the critical packets.

Block 42 represents the reconstitution function. The encrypted critical packets from the legacy CA device 20 are obtained by accessing the critical packet offset table 16, obtaining the offsets, and counting through the fully encrypted stream using the offsets from the reference PID or PIDs. At each indicated critical packet offset location, the encrypted packet at that location is obtained by, e.g., copying the packet from the stream. The critical packets are then inserted into the partially encrypted stream immediately next to the corresponding preexisting critical packets in the stream that were generated by the secondary CA device 24. The partially encrypted stream with two encrypted versions of each critical packet, one from the legacy CA device 20 and one from the secondary CA device 24, is transmitted at block 44.

While the particular SYSTEM AND METHOD FOR PARTIALLY ENCRYPTED MULTIMEDIA STREAM as herein shown and described in detail is fully capable of attaining the above-described objects of the invention, it is to be understood that it is the presently preferred embodiment of the present invention and is thus representative of the subject matter which is broadly contemplated by the present invention. For example, in a less elegant solution, the secondary CA device 24 could completely encrypt the stream, and the critical packets from the fully encrypted versions from the legacy and secondary CA devices could be copied and inserted into a third clear version of the stream from which the unencrypted critical packets have been removed. The scope of the present invention thus fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method for multimedia transmission, comprising:
   generating a copy of a multimedia stream to render first and second clear streams having identical predetermined portions;
   sending the first clear stream to a first conditional access (CA) component to encrypt the entire first clear stream to render a completely encrypted stream;
   obtaining encrypted versions of the predetermined portions from the completely encrypted stream;
   using the second clear stream, encrypting substantially only the predetermined portions using a second CA component to render a partially encrypted stream; and
   inserting the encrypted predetermined portions obtained from the completely encrypted stream into the partially encrypted stream to render a transmission stream that is only partially encrypted for transmission thereof.

2. The method of claim 1, comprising transmitting the transmission stream to plural set-top boxes over cable.

3. The method of claim 1, comprising wirelessly broadcasting the transmission stream to plural receivers.

4. The method of claim 1, wherein the first CA component is a legacy component provided by an incumbent.

5. The method of claim 1, comprising determining locations of the predetermined portions at least in one of the streams using corresponding offsets from at least one packet identifier (PID).

6. The method of claim 5, wherein the offsets are in integral numbers of packets from at least one PID.

7. The method of claim 5, wherein the offsets are used for identifying the locations of the encrypted predetermined portions in the completely encrypted stream for obtaining them and inserting them into the partially encrypted stream to render the transmission stream.

8. The method of claim 1, wherein the encrypted predetermined portions obtained from the completely encrypted stream are inserted adjacent to the predetermined portions encrypted using the second CA component in the partially encrypted stream to render the transmission stream.

9. A system for use in a digital stream transmitter head end having a legacy conditional access (CA) device, comprising:
   at least a system CA device encrypting at least predetermined portions of a first version of a stream; and
   a reconstitution component combining, into a stream, the predetermined portions from the system CA device and the predetermined portions obtained from a full encryption of a second version of the stream to render a partially encrypted stream having a first encryped version of the predetermined portions and a second encrypted version of the predetermined portions and having substantially no other encrypted data therein, the full encryption being generated by the legacy CA device.

10. The system of claim 9, wherein the predetermined portions obtained from the full encryption generated by the legacy CA device represent the same information as the predetermined portions encrypted by the system CA device, and the stream into which the predetermined portions are combined is the first version of the stream.

11. The system of claim 10, wherein the head end transmits the partially encrypted stream over cable.

12. The system of claim 10, wherein the head end wireless broadcasts the partially encrypted stream.

13. The system of claim 10, comprising at least one critical packet locator determining offsets of at least some predetermined portions from at least one packet identifier (PID).

14. The system of claim 13, wherein the offsets are in integral numbers of packets from at least one PID.

15. The system of claim 13, wherein the reconstitution component uses the offsets to insert the predetermined portions obtained from the full encryption such that the predetermined portions obtained from the full encryption are adjacent to the predetermined portions of the first version in the partially encrypted stream.

16. The system of claim 9, further comprising at least one buffer temporarily holding the first version of the stream.

17. The system of claim 13, further comprising at least one data structure storing the offsets.

* * * * *